UNITED STATES PATENT OFFICE.

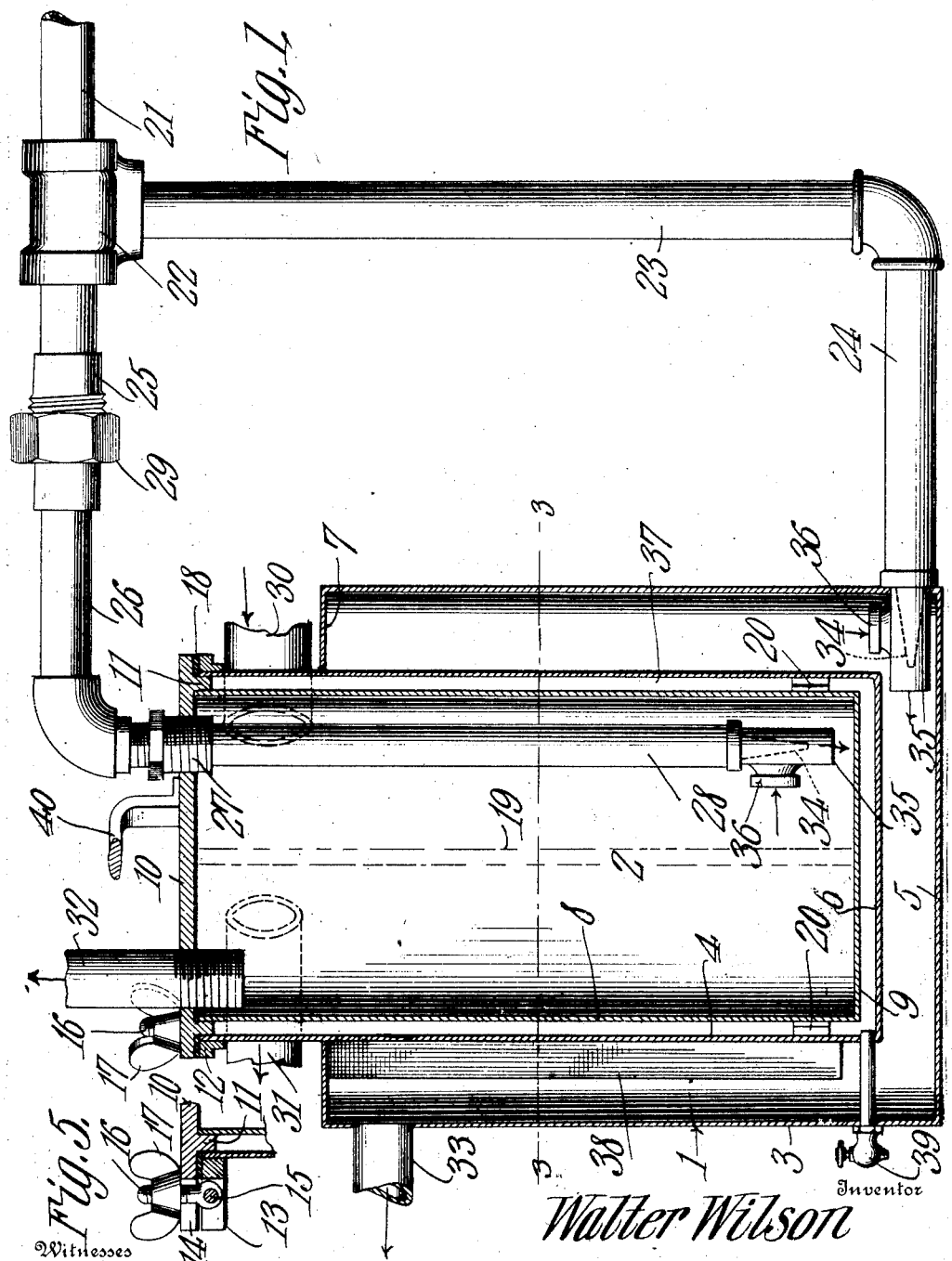

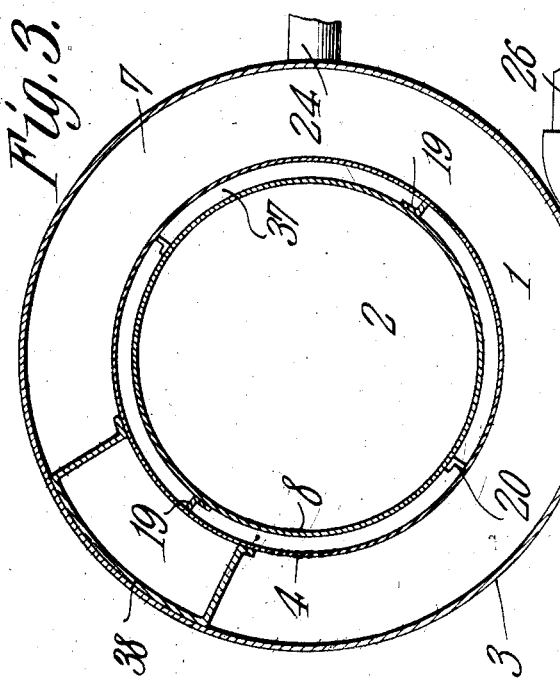
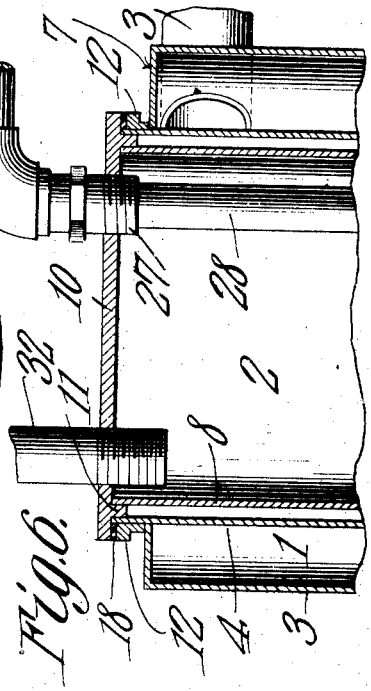
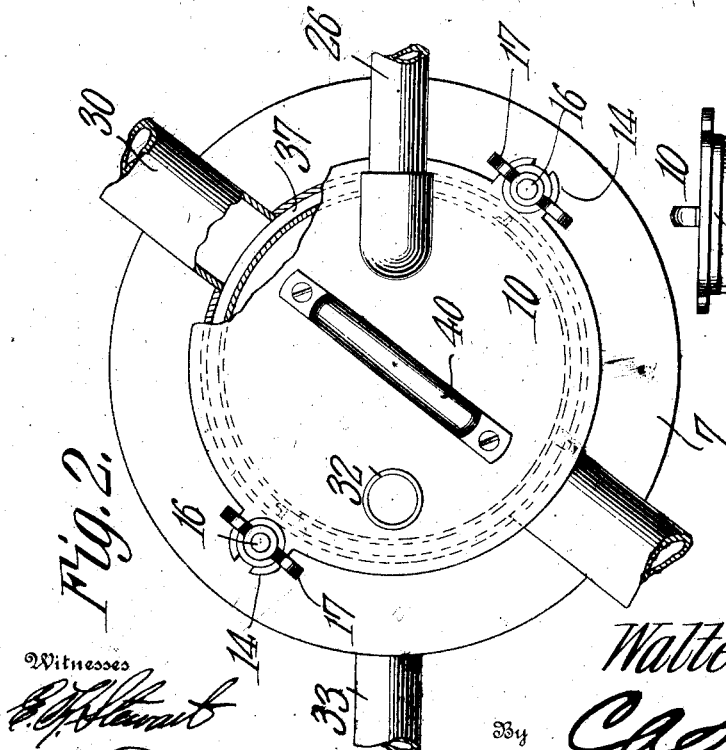
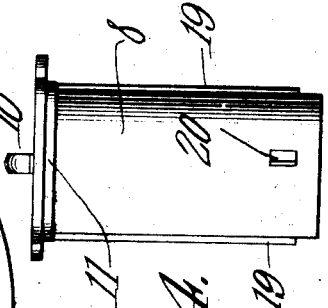

WALTER WILSON, OF YEADON, PENNSYLVANIA.

MILK PASTEURIZER AND COOLER.

No. 879,346.     Specification of Letters Patent.     Patented Feb. 18, 1908.

Application filed August 21, 1907. Serial No. 339,509.

*To all whom it may concern:*

Be it known that I, WALTER WILSON, a citizen of the United States, residing at Yeadon, in the county of Delaware and State of Pennsylvania, have invented a new and useful Milk Pasteurizer and Cooler, of which the following is a specification.

This invention relates to milk pasteurizers.

The object of the invention is to provide an apparatus of this character which shall combine simplicity of construction, high efficiency and durability in use, one in which the parts shall be so assembled as to permit ready separation for the purpose of cleaning or otherwise, and which will pasteurize milk in a rapid, certain and thorough manner and without danger of burning or overheating the milk, and will also as efficiently cool milk.

With the above and other objects in view as will appear as the nature of the invention is better understood, the same consists in the novel construction and combination of parts of a milk pasteurizer as will be hereinafter fully described and claimed.

In the accompanying drawings forming a part of this specification and in which like characters of reference indicate corresponding parts,—Figure 1 is a view in side elevation partly in section, of an apparatus constructed in accordance with the present invention. Fig. 2 is a top plan view, partly broken away. Fig. 3 is a horizontal sectional view taken on the line 3—3 of Fig. 1. Fig. 4 is a detail view in side elevation of the inner heating chamber of the apparatus. Fig. 5 is a sectional detail view of one of the clamping members for holding the two steam chambers assembled. Fig. 6 is a detail sectional view of a modified form of the invention.

The pasteurizer illustrated in Figs. 1 to 5 consists of an outer water chamber 1 and an inner water chamber 2; these parts being constructed preferably of tinned copper. The outer chamber comprises two nested cylinders 3 and 4, the former of which is closed at its lower end by a bottom 5 and the latter by a bottom 6. The cylinder 4 extends some distance above the upper end of the cylinder 3 and the two are secured together by an annulus 7.

The inner chamber 2, which consists of a single cylinder 8, is closed at its lower end by a bottom 9 and at its upper end by a cap or cover 10 which is provided with a depending flange 11 inset from the periphery of the cover, and to the inner wall of which the cylinder is secured as by being soldered or riveted thereto. To the upper end of the cylinder 4 is secured, as by being riveted or soldered thereto, a collar 12, and this collar, as well as the cover 10, is provided each with a pair of oppositely-alined longitudinally-slotted ears 13 and 14 respectively, of which the former are provided with transverse orifices that are engaged by pins 15, one only being shown. On the pins are loosely mounted threaded bolts 16 which carry winged nuts 17 that are designed by engagement with the ears 14 to force the cover tightly upon a gasket 18 interposed between the cover and the collar 12, whereby to produce a steam tight joint.

The milk heating chamber, which is defined by the space between the cylinders 4 and 8 and the bottoms 6 and 9, is comparatively slight, whereby the chamber will have a large superficial area and a small capacity, thereby to insure the thorough, rapid and economical heating of the milk.

In order to retard the passage of the milk through the heating chamber, baffles 19 are provided, in this instance two in number, which are disposed externally of the cylinder 8 and preferably in diametric alinement, and extend from the cover 10 to points near the lower end of the cylinder 8, as clearly shown in Fig. 4. As will be apparent, these baffles will compel the milk to travel downward and upward the entire length of the cylinder 8 before it escapes, and will thus insure the rapid, even and thorough treatment of the milk without danger of overheating. These baffles also subserve the further function of spacers to hold the cylinder centered with relation to the cylinder 9, additional spacers 20 being employed for this purpose which are disposed at points midway between the baffles and close to the lower end of the cylinder 8, as clearly shown in Fig. 3.

Steam is supplied to the apparatus by a pipe 21 that connects with a suitable generator, not necessary to be shown. With this pipe is connected, by a three-way union 22, a pipe 23 which has coupled with it an extension 24 that enters the cylinder 3 near its lower end. The union 22 carries one member 25 of a pipe coupler, the other member 26 of which has a threaded connection with a thimble 27 carried by the cover 10, and this thimble has threaded into it a pipe 28 that extends nearly to the bottom of the cylinder 8, as clearly shown in Fig. 1. The two members 25 and 26 of the coupler are connected by a slip nut 29, whereby when this nut is loosened the member 26 may be swung to one side, for a purpose that will presently appear.

Cold milk is supplied to the heating chamber by a pipe 30, entering the cylinder 4 near its upper end, and escapes through a pipe 31 also entering the cylinder 4 near its upper end. These pipes are relatively large in diameter in order to permit free passage of the milk and also to facilitate cleaning.

In order to permit escape of the water from the chambers 1 and 2, there is an escape pipe 32 projected through the cover 10, and a similar pipe 33 projecting through the cylinder 3.

In the modification shown in Fig. 6, the only difference over that shown in Figs. 1 to 5 is that the cylinder 3 is extended up to the cover 10.

In order to effect rapid agitation and thus accelerated heating of the water in the two chambers 1 and 2, each of the pipes 24 and 28 has combined with its lower end a mixer comprising a jet nozzle 34 and a combining tube 35, the latter having a lateral intake 36 through which the water passes to the tube and thence along with the condensed steam to the respective chambers.

Under some conditions it may be desired to reduce the capacity of the chamber 1 without changing the capacity of the heating chamber 37, as when milk is to be cooled, and to secure this, a filler or space reducer 38 is employed which is a hollow open-sided rectangular structure of sheet metal secured to the outer wall of the cylinder 4 and preferably, though not of necessity, abuts the inner wall of the cylinder 3 and extends from the annulus 7 to a point near the lower end of the cylinder 4, as clearly shown in Fig. 1. This filler will of course materially lessen the capacity of the chamber 1 and will consequently lighten the structure as a whole and make it easier to handle.

The filler will generally be employed only on large pasteurizers, and the mixers only when the apparatus is used for heating milk, it being obvious that they would be of no particular utility when cooling is to be effected.

To remove any small quantity of milk that remains in the chamber 37, after the conclusion of the operation of either pasteurizing or of cooling milk, a faucet 39 is employed that is disposed exteriorly of the chamber 1 and communicates with the bottom portion of the cylinder 4.

The operation of the device when used as a pasteurizer will be as follows: Milk from a suitable source is allowed to pass through the pipe 30 into the heating chamber 37, whence it passes down around one-half of the circumference of the cylinder 2, this being effected by the baffles 19, thence passes around the bottom of the cylinder 8 and upward around the other side of the cylinder 2 to the escape 31. Of course it will be understood that prior to the admission of milk, hot water is supplied to the chambers 1 and 2, through the pipes 24 and 28, and then steam is supplied through the same pipes to the chambers. Owing to the provision of the mixers, the water will be drawn into the intakes 36 and discharged through the combining tubes 35 along with the condensed steam, and this constant discharge will operate to agitate the entire contents of both of the chambers and thus secure rapid and e n heating thereof. As the feed of the milk will be by gravity it will be comparatively slow so that ample time will be afforded to effect thorough pasteurizing. When the operation has been completed the nut 29 is loosened and the pipe member 26 is turned to one side, after which the winged nuts 17 are loosened and swung outward, thereby leaving the cover free to be lifted by a handle 40 secured to the cover. This leaves the interior of the heating chamber free to be thoroughly cleansed as also the cylinder 2 and pipes 28 and 26.

It will be understood of course that this apparatus may be employed for cooling milk merely by supplying brine or any other cooling medium to the chambers 1 and 2 instead of steam, and as above stated, under this latter use the mixers may be omitted, although if preferred they may be employed thus to constitute the apparatus a combined pasteurizer and cooler.

What is claimed is:—

1. A milk pasteurizer embodying spaced inner and outer water chambers defining a heating chamber, and vertically disposed baffles for causing the liquid being treated to pursue a tortuous passage before escape.

2. A milk pasteurizer comprising inner and outer water chambers defining a heating chamber, and vertically disposed baffles carried by the inner chamber and extending from its upper end to a point near its lower end.

3. A pasteurizer comprising inner and outer water chambers defining a heating chamber, vertically disposed baffles arranged within the latter chamber and constituting means for holding the two chambers properly spaced.

4. A milk pasteurizer embodying spaced inner and outer water chambers defining a heating chamber, pipes for supplying steam to the water chambers, and mixers on the pipes for agitating the water within the said chambers, one of which mixers discharges downward against the floor of the inner chamber and the other of which discharges horizontally of the outer chamber.

5. A milk pasteurizer embodying spaced inner and outer water chambers defining a heating chamber, and a space reducer arranged between the two chambers.

In testimony that I claim the foregoing as my own, I have hereto affixed my signature in the presence of two witnesses.

WALTER WILSON.

Witnesses:
 JOSEPH P. BAUMAN,
 JULIUS KRIDER.